United States Patent
Ross et al.

(10) Patent No.: US 6,275,187 B1
(45) Date of Patent: Aug. 14, 2001

(54) SYSTEM AND METHOD FOR DIRECTING AN ADAPTIVE ANTENNA ARRAY

(75) Inventors: John Anderson Fergus Ross, Schenectady; John Erik Hershey, Ballston Lake; Richard August Korkosz, Rotterdam Junction; Naofal Mohammed Wassel Al-Dhahir, Niskayuna, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/227,371

(22) Filed: Jan. 8, 1999

Related U.S. Application Data

(60) Provisional application No. 60/076,666, filed on Mar. 3, 1998, and provisional application No. 60/076,610, filed on Mar. 3, 1998.

(51) Int. Cl.$^7$ .................................................. H01Q 3/22
(52) U.S. Cl. ............................ 342/372; 342/74; 342/175; 342/195; 342/367; 342/368; 342/371; 342/377
(58) Field of Search ...................... 342/73–81, 89–91, 342/94–103, 147, 157, 158, 165, 173–175, 195, 361, 362, 367, 368–372, 377

(56) References Cited

U.S. PATENT DOCUMENTS

| | | | |
|---|---|---|---|
| H126 | * | 9/1986 | Allen et al. .............................. 342/75 |
| 5,400,037 | | 3/1995 | East . |
| 5,488,737 | | 1/1996 | Harbin et al. . |
| 5,559,865 | | 9/1996 | Gilhousen . |
| 5,825,808 | | 10/1998 | Hershey et al. . |

FOREIGN PATENT DOCUMENTS

| | | |
|---|---|---|
| 0 745 867 | 5/1995 | (EP) . |
| 0 869 578 | 4/1998 | (EP) . |
| 2 271 486 | 10/1992 | (GB) . |
| WO 98/16077 | 4/1998 | (WO) . |

OTHER PUBLICATIONS

"An Adaptive Antenna for the NMT 900 Mobile Telephony System," H. Anderson, M. Landing, A. Rydberg, T. Oberg; IEEE, Aug. 6, 1994, pp. 610–614.

* cited by examiner

*Primary Examiner*—Bernarr E. Gregory
(74) *Attorney, Agent, or Firm*—Marvin Snyder; Douglas E. Stoner

(57) ABSTRACT

A system for directing a receiving lobe of an adaptive antenna array toward an aircraft in flight includes an aircraft position vector calculator and an antenna weight vector generator. The aircraft position vector calculator receives aircraft position information from an aircraft tracking service and calculates, based upon the aircraft position information it receives, an aircraft position vector g. An antenna weight vector generator receives the aircraft position vector g from the aircraft position vector calculator and generates, based upon the aircraft position vector g, an antenna element weight vector w. The antenna weight vector w is applied to the elements of an adaptive antenna array to direct a receiving lobe of the array towards an aircraft in flight.

8 Claims, 3 Drawing Sheets

| | | |
|---|---:|---|
| TRANSMIT POWER (dBm0) | 35 | |
| CARRIER FREQUENCY (GHz) | 2.442 | |
| WAVELENGTH (METER) | 0.12285 | |
| TRANSMIT ANTENNA GAIN (dBi) | -2 | |
| TRANSMITTED ELRP (dBm) | 33 | FCCallows up to |
| RANGE (MILES) | 200 | 36 dbm |
| RANGE (Km) | 321.8 | |
| FREE SPACE LOSS (dBm) | -150.348 | |
| BOLTZMANN'S CONSTANT | -228.6 | |
| OTHER LINK LOSSES (dB) | -1 | |
| RECEIVE ANTENNA LEMENT DIAMETER (cm) | 20 | |
| RECEIVE ANTENNA ELEMENT EFFICIENCY | 0.6 | 60% EFFICIENCY |
| RECEIVE ANTENNA ELEMENT GAIN (dBi) | 11.95759 | |
| NUMBER OF RECEIVE ARRAY ELEMENTS | 16 | Arrat gain of 12 dB |
| RECEIVE ANTENNA ARRAY GAIN (dBi) | 23.99879 | |
| RECEIVER NOISE FIGURE (dB) | 3 | |
| RECEIVER NOISE FIGURE (DIMENSIONLESS) | 1.995262 | |
| RECEIVER NOISE TEMPERATURE (K) | 288.6261 | |
| ANTENNA NOISE TEMPERATURE (K) | 100 | Tsky=70 Tgnd=30 |
| SYSTEM NOISE TEMPERATURE (K) | 388.62.61 | |
| SYSTEM NOISE TEMPERATURE (dB.K) | 25.89532 | |
| RECEIVER G/T (dB/K) | -1.89653 | |
| PR/NO (dB.bps | 78.35507 | |
| DATA RATE (kbps) | 1000 | 1 Mbps |
| DATA RATE (dB-kbps) | 30 | |
| IMPLEMENTATION LOSS (dB) | -2 | |
| AVAILABLE Eb/No (dB) | 16.35507 | |
| BIT ERROR RATE | $10^{-5}$ | |
| MODULATION SCHEME | DQPSK | |
| REQUIRED Eb/No (dB) | 12 | |
| CODING GAIN (dB) | 0 | No coding |
| MARGIN (dB) | 4.355072 | |

*fig. 3*

SYSTEM AND METHOD FOR DIRECTING AN ADAPTIVE ANTENNA ARRAY

CROSS REFERENCE TO RELATED APPLICATIONS

This invention claims priority from provisional application Ser. Nos. 60/076,666 filed Mar. 3, 1998, and 60/076,610 filed Mar. 3, 1998, both of which are hereby incorporated by reference.

BACKGROUND OF THE INVENTION

The present invention relates to antennas for radio frequency telemetry applications, and more particularly to a system and method for directing an adaptive antenna array in the direction of an aircraft in flight in order to establish a radio frequency (RF) communication link between the aircraft in flight and a receiver.

A significant problem encountered in the art of in-flight telemetry relates to the frequency and, more importantly, the power at which telemetry devices can transmit RF signals. Until the enactment by the Federal Communications Commission (FCC) of Part 15.247 of the FCC Rules and Regulations, aircraft telemetry systems were primarily limited to the VHF band (174–216 MHz), and could only operate at very low transmission powers of less than 0.1 milliwatts (mW) (FCC Part 15.241). This restriction on the transmission power has significantly limited the transmission range (i.e., the maximum distance between the transmitter and the receiver) of airborne telemetry devices.

Directional antennas, such as those used in conventional RF communications receivers have forward lobes or beams that represent areas of maximum receiver gain. The receiver gain is generally highest when these beams are positioned in the direction of the signal source. Such antennas also typically have nulls, or areas of lowest gain, e.g., at their sides. Nulls can be positioned to desensitize reaction to unwanted signals, based on their direction of arrival. The position of lobes and nulls in such antennas is commonly fixed upon installation and remains fixed over time.

However, the position of an aircraft in flight is constantly changing with respect to a given ground based receive antenna. Accordingly, a problem exists in the telemetry arts with respect to establishing reliable telecommunication links between an aircraft in flight and a ground based receiver, especially under circumstances in which the output power of the transmit antenna on board the aircraft in flight is limited.

BRIEF SUMMARY OF THE INVENTION

The present invention overcomes this problem by providing a system and method for electronically steering the main lobe of a receive antenna array pattern in the direction of an aircraft in flight while simultaneously minimizing the receiver sensitivity to signals from other directions, including interference signals from other directions and background thermal noise from other directions. In an exemplary embodiment of the invention, a system and associated method for directing a main receiving lobe of an adaptive antenna array toward an aircraft in flight comprises an aircraft position vector calculator and an antenna weight vector generator. The aircraft position vector calculator receives aircraft position information for an aircraft from an aircraft tracking means such as an aircraft tracking service. The aircraft position vector calculator calculates an aircraft position vector g, for selected aircraft in flight, and provides position vector g at an output. The antenna weight vector generator receives aircraft position vector g from the aircraft position vector calculator and generates an antenna weight vector w, based on position vector g. The weight vector generator provides antenna weight vector w to the antenna elements of the adaptive antenna array such that a receiving lobe of the adaptive antenna array is directed toward the aircraft in flight.

BRIEF DESCRIPTION OF THE DRAWINGS

FIG. 3 shows exemplary specifications for a communications link according to one embodiment of the invention.

DETAILED DESCRIPTION OF THE INVENTION

Figure 1:
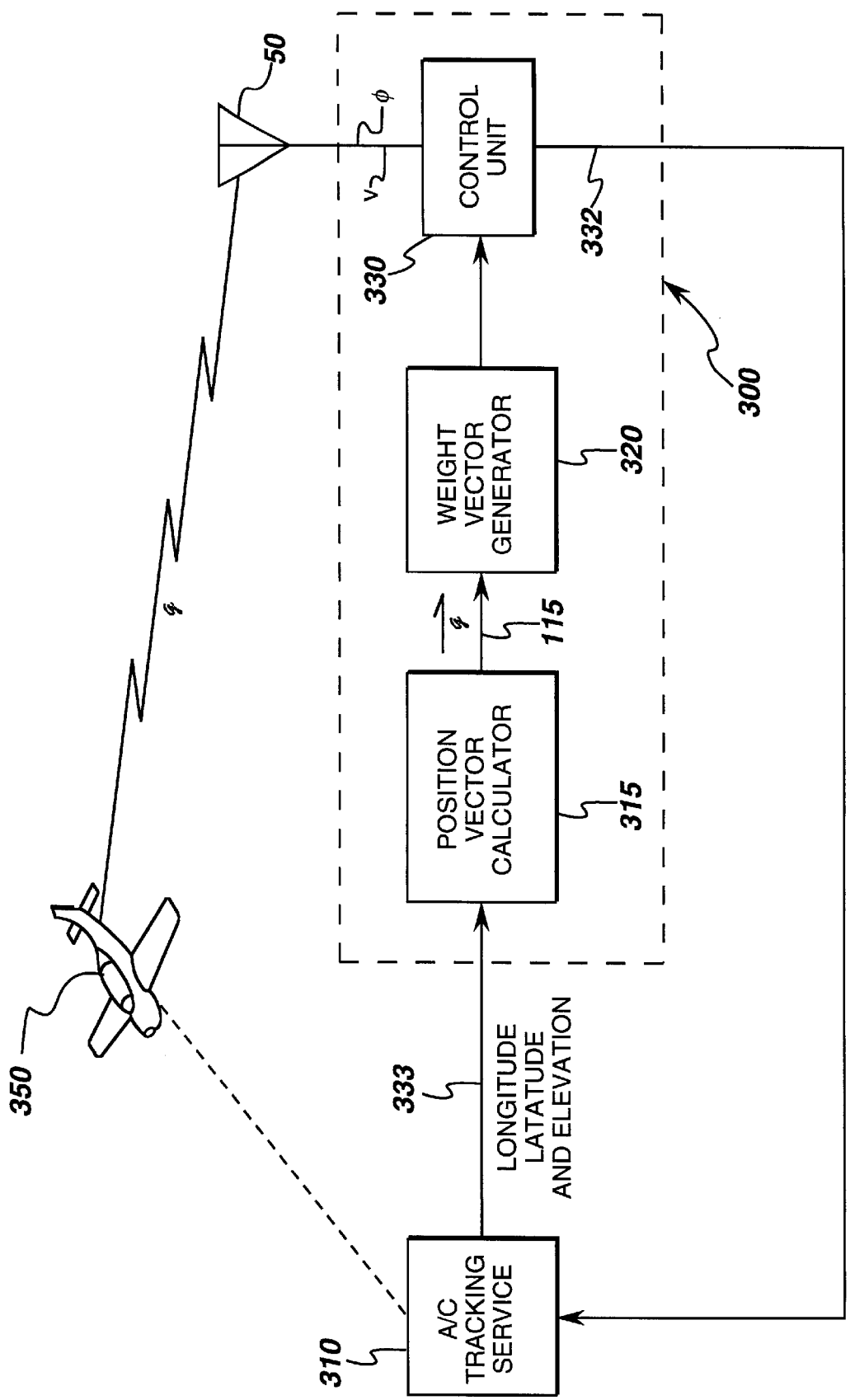
FIG. 1 shows a block diagram of a system for directing an adaptive antenna array according to one embodiment of the invention.

A block diagram of an adaptive antenna array 50 and a system for directing the adaptive antenna array (referred to hereinafter as antenna directing system 300) according to one embodiment of the present invention is illustrated in FIG. 1. As used herein, the term "adaptive antenna array" refers to an antenna array capable of electronically steering a beam toward a desired signal thereby maximizing the signal to noise ratio of the desired signal. For a general discussion of common adaptive arrays, see *Antennas,* John D. Krauss, Second Edition, Section 11–13, "Adaptive Arrays and Smart Antennas."

The antenna directing system 300 of the present invention comprises an aircraft position vector calculator 315 coupled to a weight vector generator 320. A control unit 330 is coupled to weight vector generator 320 such that the control unit distributes the output w from weight vector generator 320 to individual elements of array 50. For purposes of this specification boldface type is used to indicate vector quantities. The vector quantity w comprises n complex elements (n being the number of elements in array 50), that is, n magnitude and phase pairs, wherein each pair corresponds to an individual element of array 50. For example, $w_i$ controls element i of array 50. In this manner, antenna directing system 300 enables antenna array 50 to electronically change, or adapt, its radiation pattern over time to optimize signal reception in the direction of an aircraft 350.

Aircraft position vector calculator 315 is a programmable calculator, or processor, programmed to calculate a position vector g for aircraft selected by control unit 330. A position vector g is defined herein to be a vector directed along an axis from antenna array 50 to selected aircraft 350. Position vector g is calculated from position data indicating the position of selected aircraft 350. As used herein, the term "aircraft" includes all airborne craft such as helicopters, airplanes, gliders, drones, and balloons.

In one embodiment of the present invention, position data includes, but is not limited to, latitude, longitude and elevation information associated with the position of aircraft 350. Position data could also include range and bearing data for aircraft 350 such as that obtained by aircraft 350 from on board VHF Omni Ranging (VOR) equipment, or other direction or position finding instruments. In one embodiment of the present invention position data for aircraft 350 is supplied to system 300 by an aircraft tracking service 310. One example of a commercial provider of aircraft tracking software suitable for use in the present invention is RLM Software, of Boston Mass. Another example of aircraft tracking service 310 is Airtrak, an aircraft tracking program readily commercially available from METSYS Software & Services, Cropton, Pickering, North Yorkshire, YO18 8HL, England. The Airtrak program allows a user to generate maps for any area of the world, overlay the maps with a latitude/longitude grid, reporting points, towns and airfields.

Figure 2:
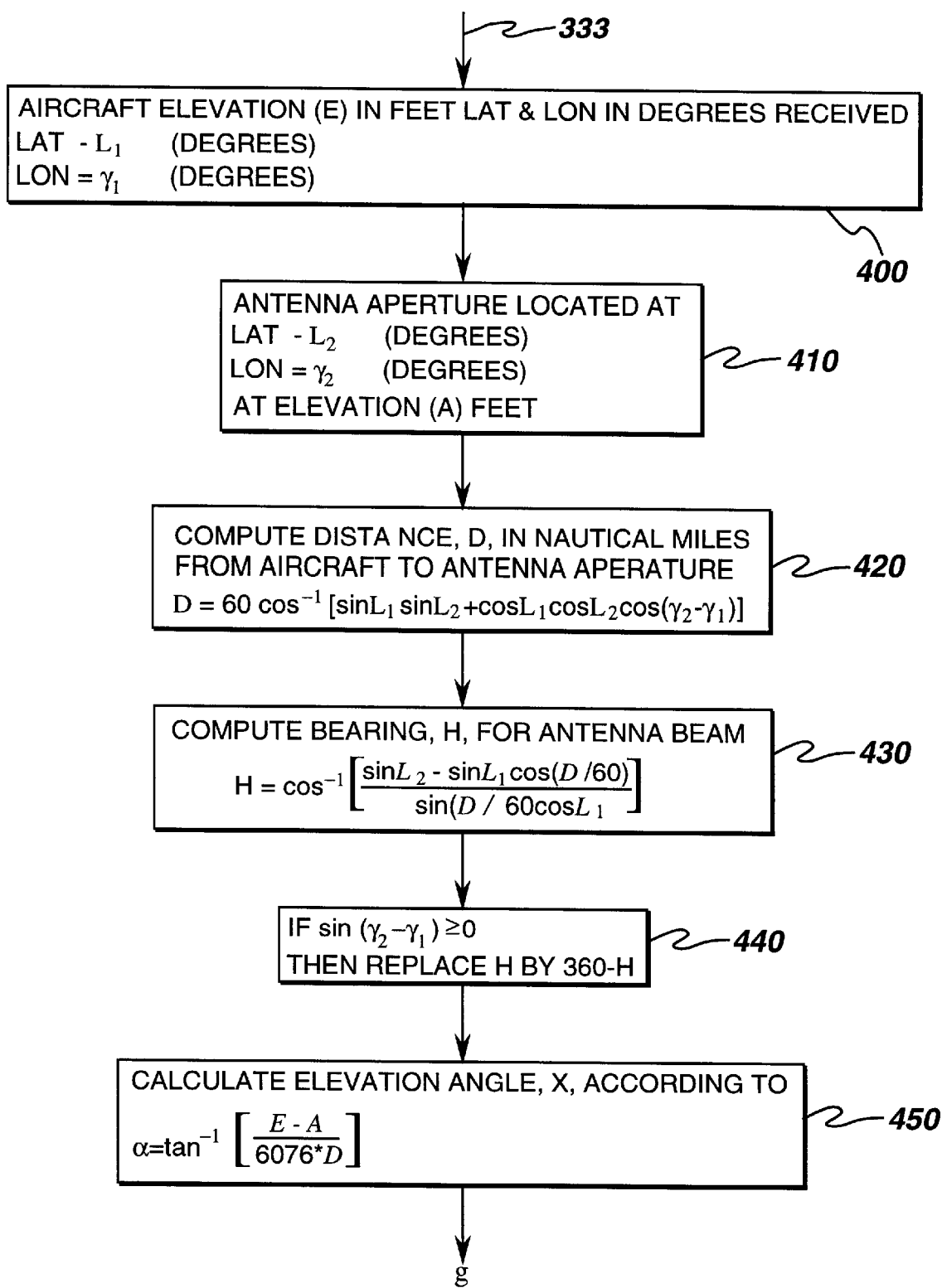
FIG. 2 is a flow chart of the steps of a method for computing aircraft position vector g according to one embodiment of the invention.

The Airtrak program plots the route of the requested flight as the flight progresses. It will be recognized, however, that Airtrak is but one of many available aircraft position tracking means suitable for use in the present invention. Other suitable means include Global Positioning System (GPS) tracking means, satellite tracking means Position vector calculator 315 employs calculations commonly applied in the navigation arts to calculate the relative position of an object with respect to another object based on latitude, longitude and elevation information. One example of a calculation performed by position vector calculator 315 in an embodiment of the invention is illustrated in FIG. 2.

First, position information 333, i.e., elevation (E), latitude ($L_1$) and longitude ($\gamma_1$) of aircraft 350 is obtained from aircraft tracking service 310 and stored in memory as shown in block 400. Also stored in memory are the latitude ($L_2$) longitude ($\gamma_2$) and elevation (A) of antenna array 50 as shown in block 410. The distance D from antenna array 50 to aircraft 350 is computed according to the relationship:

$$D = 60\cos^{-1}[\sin L_1 \sin L_2 + \cos L_1 \cos L_2 \cos(\gamma_2 - \gamma_1)],$$

as shown in block 420, wherein $L_1$ refers to the latitude of aircraft 350, $L_2$ refers to the latitude of array 50, $\gamma_1$ refers to the longitude of aircraft 350 and $\gamma_2$ refers to the longitude of array 50.

Once D is obtained, the bearing H of aircraft 350 from antenna array 50 is calculated according to the relationship:

$$H = \cos^{-1}\left[\frac{\sin L_2 - \sin L_1 \cos(D/60)}{\sin(D/60)\cos L_1}\right],$$

as shown in block 430.

Bearing adjustments for southern latitudes and eastern longitudes are made as shown in block 440. Finally, elevation angle $\alpha$ is computed according to the relationship:

$$\alpha = \tan^{-1}\left[\frac{E - A}{6076 * D}\right]$$

as shown in block 450. Accordingly, position vector g comprises elevation angle and bearing as calculated in FIG. 2.

As an airplane moves, its position vector g changes and the optimal array weights are recomputed to track these changes. This adaptive nature of antenna directing system 300 allows it to perform well in a nonstationary environment. In one embodiment of the present invention antenna directing system 300 is implemented in real-time using a programmable Digital Signal Processor (DSP) chip. One embodiment of the present invention employs the TMS320C50, a DSP which is available from Texas Instruments.

Beam steering computations, algorithms and devices for directing an antenna beam of an adaptive antenna array in a desired direction by weighting individual elements of the antenna array are commonly employed. See, e.g., *Radar Handbook,* Merrill I. Skolnik, Second Edition, particularly Chap. 7, "Phased Array Radar Antennas." As used herein, the term "weighting" as applied to an element of an antenna array, refers to supplying a signal including a phase shift angle and amplitude such that the beam of the antenna array is electronically steered in a desired direction.

The system 300 of the present invention operates by weighting antenna array 50. According to the invention, system 300 determines these weights based on g, i.e. data about the latitude, longitude and elevation of aircraft 350. That is, weight vector generator 320 provides an output w based upon aircraft position vector g to give desired radiation characteristics to antenna array 50. These characteristics include directivity and main lobe position in the direction g of aircraft 350 together with low sidelobes along other directions. In one embodiment of the invention, weight vector w comprises the individual weights $w_i$, that is, individual phase and amplitude values, or steering values, for individual elements of adaptive array 50 such that a main receiving lobe, or beam, of adaptive array 50 is directed, or steered in direction g, that is, toward aircraft 350. In one embodiment of the present invention, weight vector generator 320 employs a digital signal processor (DSP) programmed to perform steering computations which generate weight vector w. The DSP may be the same DSP used to implement position vector calculator 315. Alternative embodiments of the invention comprise other computing means for generating weight vector w such as a computer or microprocessor.

In operation, when it is desired to receive communications from a particular aircraft in flight, such as aircraft 350, control unit 330 sends a message 332 to aircraft tracking service 310 requesting position information related to aircraft 350. In one embodiment of the present invention, standardized airline identification codes, as commonly employed in the airline industry, are contained within message 332 to identify a particular aircraft for which position information is requested.

As previously described, upon receipt of message 332, aircraft tracking service 310 begins to supply position information 333, including latitude, longitude and elevation data for aircraft 350 to position vector calculator 315. Aircraft position vector calculator 315 receives position information 333 and calculates an aircraft position vector g based on position information 333 and known position information, that is latitude, longitude and elevation, of array 50. Weight vector generator 320 receives aircraft position vector g and generates weight vector w. Weight vector w is applied to antenna array 50 through control unit 330 resulting in the elements of antenna array 50 directed toward aircraft 350. The construction of control unit 330 is known in the radar signal processing arts, where it is common to electronically steer individual elements of an array using phase and amplitude signal pairs obtained from an array of vectors.

With the enactment of Part 15.247 in 1985, the FCC authorized the use of the 902–928 MHz, 2400–2483.5 MHz and 5725–5850 MHz Industrial, Scientific, and Medical (ISM) band. One embodiment of the invention takes advantage of the ISM band, an RF spectrum for which no license is required and which is relatively uncrowded and expected to remain so for a reasonable period of time. In one embodiment of the present invention antenna array 50 is adapted to establish an ISM band communications link with aircraft 350.

Model communications link specifications for an embodiment of system 300 including a receiver adapted to establish an ISM band in-flight air-to-ground communications link with aircraft 350 are given in FIG. 3. In this embodiment of the invention, no reverse link (ground-to-air-link) is modeled and the model presumes a digital quadrature phase shift keying (DQPSK) modulation scheme of a type generally known in the art. Model transmit power, carrier frequency wavelength, transmit antenna gain and effective isotropic radiated power (EIRP) for one embodiment of the invention are shown.

The element diameter of the receive antenna (indicated in FIG. 2 at 50), receive antenna gain and antenna efficiency are also shown. In this embodiment of the invention, a model for adaptive array 50 comprised 16 elements. As indicated in FIG. 3 data rate in the general range of about one megabit per second is predicted.

Another embodiment of the invention includes a ground-to-air link having nominal and FCC permitted parameter values. This link establishes a reverse link in addition to an air-to-ground link. The ground to air data link is used to issue telemetry commands to aircraft 350. In one embodiment of the present invention, a typical control protocol is implemented utilizing narrowband ground-to-aircraft communications links that are already in use; and another embodiment of the present invention uses an antenna and modem that is already installed on a ground site for other purposes.

An alternative embodiment of the present invention envisions 5.7 GHz band transceivers. Both the 2.4 Ghz band and the 5.7 GHz band are desirable embodiments because there is not much activity in these bands at the present time. In addition, the most problematic source of interference within the 2.4 GHz band is microwave ovens, from which interference is negligible.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A system for directing a receiving lobe of an adaptive antenna array toward an aircraft in flight comprising:
   an aircraft position vector calculator for receiving aircraft position information and for calculating, based upon said aircraft position information, an aircraft position vector g;
   an antenna weight vector generator for receiving said aircraft position vector g from said aircraft position vector calculator and for generating, based upon said aircraft position vector g, an antenna element weight vector w; and
   an adaptive antenna array comprising a plurality of antenna elements for receiving said antenna element weight vector w and for adjusting the respective weights of said elements in accordance with said weight vector w such that a receiving lobe of said adaptive antenna array is directed toward said aircraft in flight.

2. The system of claim 1 wherein said aircraft position information comprises latitude, longitude and elevation of said aircraft.

3. The system of claim 1 including a source of aircraft tracking information wherein said aircraft position information is provided by said source of aircraft tracking information.

4. The system of claim 1 wherein said antenna array is operative to receive ISM band radio frequency communications.

5. The system of claim 1 wherein said position vector calculator and said weight vector generator are implemented on a digital signal processor (DSP).

6. A system for directing a receiving lobe of an adaptive antenna array toward an aircraft in flight comprising:
   an aircraft tracking means for providing aircraft position information for aircraft in flight;
   an aircraft position vector calculating means for receiving said aircraft position information from said aircraft tracking means, and for calculating, based upon said aircraft position information, an aircraft position vector g;
   an antenna weight vector generating means for receiving said aircraft position vector g from said aircraft position vector calculating means and for generating, based upon said aircraft position vector g, an antenna element weight vector w; and
   an adaptive antenna array means comprising a plurality of antenna elements for receiving said antenna element weight vector w and for adjusting the respective weights of said elements in accordance with said weight vector w such that a receiving lobe of said adaptive antenna array means is directed toward said aircraft in flight.

7. A system for directing a receiving lobe of an adaptive antenna array toward an aircraft in flight comprising:
   an antenna array comprising M array elements for receiving radio frequency energy in the ISM band, wherein the gain of the $M_i$th array element is proportional to a weight $w_i$;
   an aircraft tracking means for providing aircraft position information for an aircraft in flight wherein said position information comprises the latitude, longitude and elevation of said aircraft in flight;
   an aircraft position vector calculator for receiving said aircraft position information and for calculating, based upon said aircraft position information, an aircraft position vector g;
   an antenna weight vector for receiving said aircraft position vector g from said aircraft position vector calculator and for generating, based upon said aircraft position vector g, an antenna element weight vector w comprising individual element weights $w_i$; and
   said $M_i$th element of said array being operative to receive said weight $w_i$ such that a receiving lobe of said adaptive antenna array means is directed toward said aircraft in flight.

8. A method for directing a receiving lobe of an adaptive antenna array toward an aircraft in flight comprising the steps of:
   obtaining position information for said aircraft;
   calculating a position vector g based upon said position information, said aircraft position vector g representing the direction of an aircraft from said adaptive antenna array;
   calculating a weight vector w based upon said position vector g; and
   providing said weight vector w to the elements of said adaptive antenna array so as to direct a receiving lobe of said adaptive antenna array toward said aircraft.

* * * * *